US 11,273,358 B2

United States Patent
Tana et al.

(10) Patent No.: US 11,273,358 B2
(45) Date of Patent: Mar. 15, 2022

(54) METHOD AND SYSTEM FOR TRANSMITTING AUDIO SIGNALS TO EXERCISE MACHINES OF A TRAINING CLASS

(71) Applicant: TECHNOGYM S.p.A., Forli'-Cesena (IT)

(72) Inventors: Marcello Tana, Forli'-Cesena (IT); Pietrino Atzeni, Forli'-Cesena (IT); Stefano Santilli, Forli'-Cesena (IT); Mauro Fabbri, Forli'-Cesena (IT)

(73) Assignee: TECHNOGYM S.p.A., Forli'-Cesena (IT)

( * ) Notice: Subject to any disclaimer, the term of this patent is extended or adjusted under 35 U.S.C. 154(b) by 648 days.

(21) Appl. No.: 16/169,507

(22) Filed: Oct. 24, 2018

(65) Prior Publication Data

US 2019/0118067 A1 Apr. 25, 2019

(30) Foreign Application Priority Data

Oct. 25, 2017 (IT) .......................... 102017000121397

(51) Int. Cl.
*A63B 71/06* (2006.01)
*H04R 3/12* (2006.01)
(Continued)

(52) U.S. Cl.
CPC ...... *A63B 71/0622* (2013.01); *A63B 24/0075* (2013.01); *G09B 19/0038* (2013.01);
(Continued)

(58) Field of Classification Search
CPC ............ A63B 71/0622; A63B 24/0075; A63B 22/0076; A63B 22/02; A63B 22/0605;
(Continued)

(56) References Cited

U.S. PATENT DOCUMENTS

| 9,880,805 B1* | 1/2018 | Guralnick | ............. G06F 3/0482 |
| 2008/0207401 A1* | 8/2008 | Harding | ............. A63B 24/0006 482/4 |

(Continued)

FOREIGN PATENT DOCUMENTS

| EP | 1 110 584 A2 | 6/2001 |
| EP | 2 144 427 A1 | 1/2010 |
| WO | 01/03777 A1 | 1/2001 |

OTHER PUBLICATIONS

Italian Search Report for corresponding Italian Patent Application No. 102017000121397 dated Jun. 11, 2018, 7 pages.

*Primary Examiner* — Fan S Tsang
*Assistant Examiner* — David Siegel
(74) *Attorney, Agent, or Firm* — Merchant & Gould P.C.

(57) ABSTRACT

A method transmits audio signals to exercise machines of a training class including providing a control unit accessible to a trainer user managing a training class. Exercise machines operatively connect to the control unit by a data communication network. The exercise machines include a first group of exercise machines used in the training class. The control unit and each exercise machine of the first group establish a data communication channel for transmitting audio signals between the control unit and the first group of exercise machines. The control unit receives a first audio signal representative of a voice control by the trainer user and a second audio signal representative of a piece of music selected by the trainer user. The control unit sends the encoded first and second audio signals to all exercise machines of the first group of exercise machines by the communication channel.

18 Claims, 5 Drawing Sheets

(51) Int. Cl.
    *A63B 24/00*     (2006.01)
    *G09B 19/00*     (2006.01)
    *A63B 22/00*     (2006.01)
    *A63B 22/02*     (2006.01)
    *A63B 22/06*     (2006.01)

(52) U.S. Cl.
    CPC ............ *H04R 3/12* (2013.01); *A63B 22/0076* (2013.01); *A63B 22/02* (2013.01); *A63B 22/0605* (2013.01); *A63B 2022/0658* (2013.01); *A63B 2024/0081* (2013.01); *A63B 2071/063* (2013.01); *A63B 2071/068* (2013.01); *A63B 2071/0625* (2013.01); *A63B 2071/0683* (2013.01); *A63B 2220/808* (2013.01); *A63B 2225/20* (2013.01); *A63B 2225/50* (2013.01); *H04R 2430/01* (2013.01)

(58) Field of Classification Search
    CPC .... A63B 2022/0658; A63B 2071/0625; A63B 2071/063; A63B 2071/068; A63B 2071/0683; A63B 2220/808; A63B 2225/20; A63B 2225/50; A63B 2024/0081; G09B 19/0038; H04R 3/12; H04R 2430/01; G06F 3/16; G06F 3/165
    See application file for complete search history.

(56) References Cited

U.S. PATENT DOCUMENTS

| | | | |
|---|---|---|---|
| 2009/0291805 A1* | 11/2009 | Blum | A63B 71/0622 |
| | | | 482/9 |
| 2013/0137073 A1* | 5/2013 | Nacey | A63B 24/0075 |
| | | | 434/247 |
| 2015/0238817 A1* | 8/2015 | Watterson | A63B 23/0476 |
| | | | 482/8 |
| 2018/0280782 A1* | 10/2018 | Lagree | A63B 21/0428 |

\* cited by examiner

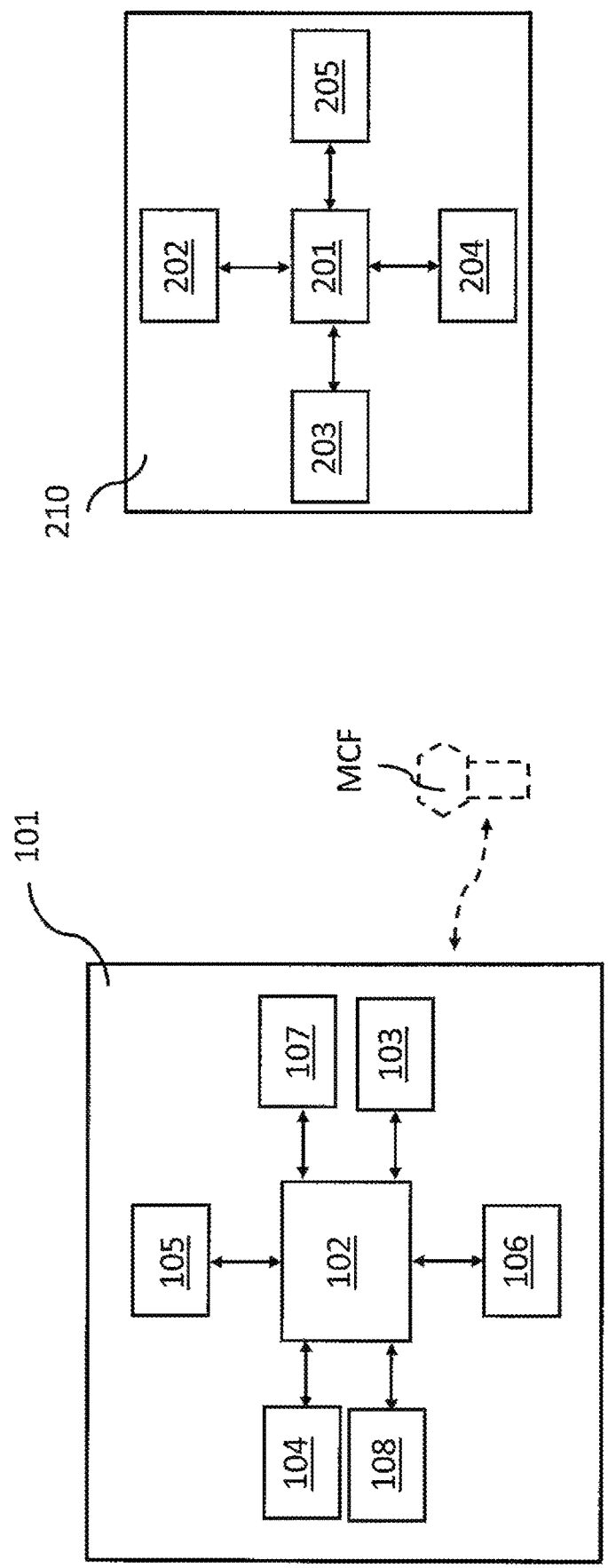

METHOD AND SYSTEM FOR TRANSMITTING AUDIO SIGNALS TO EXERCISE MACHINES OF A TRAINING CLASS

This application claims benefit of Serial No. 102017000121397, filed 25 Oct. 2017 in Italy and which application is incorporated herein by reference. To the extent appropriate, a claim of priority is made to the above disclosed application.

Field of the Invention

The present invention relates to the field of fitness and, in particular, a method and system for transmitting audio signals to exercise machines of a training class.

BACKGROUND OF THE INVENTION

Nowadays, the concept of training class, i.e. training of multiple users each on an exercise machine of a plurality of exercise machines of the same type (e.g. treadmills or bikes) arranged inside the same location (gym or club) is very widespread.

The training class is managed and coordinated by a coach or personal trainer who, by voice, in addition to motivating and encouraging users during the training, indicates when imparting commands to the respective exercise machine (e.g. a change of gradient/speed in a treadmill or a change of resistance on a bike) so that a specific training program previously chosen by the personal trainer for that training class on that specific plurality of exercise machines can be followed and respected.

This training method is not free from faults.

Indeed, it appears difficult for a user to be able to clearly recognize and properly understand the voice commands provided by the personal trainer.

This is firstly due to the excessive noise which may be present in the location intended for training class (e.g. music or background noise).

Furthermore, it is worth noting that there are gyms or clubs in which no closed spaces can be univocally intended for a training class but simply open spaces distributed inside the gym or club.

In this configuration, the noise which could disturb the individual user is not just that of the single training class but may be the noise present in the entire gym and that of all training classes present.

Such drawback is even more apparent considering the possible distraction of the user due to the physical effort of the training program.

Therefore, the users of the same training class risk not being mutually coordinated or being able to respect the training program previously prepared by the personal trainer for that class as best as possible.

Furthermore, some users of the training class could impart incorrect commands to their respective exercise machine also if they are breathless due to the excessive effort with the risk of physical problems, falling from the exercise machine and so on.

SUMMARY OF THE INVENTION

It is the object of the present invention to devise and provide a method and system for transmitting audio signals to exercise machines of a training class which allows to solve at least partially the drawbacks illustrated above with reference to the prior art, which is as reliable and performing as possible.

BRIEF DESCRIPTION OF THE DRAWINGS

A system configured to execute the aforesaid method is a further object of the present invention.

Further features and advantages of the method and system according to the invention will be apparent from the following description of preferred embodiments, given by way of indicative, non-limiting examples, with reference to the accompanying figures, in which:

FIGS. 2 and 3 shows, by means of a respective block chart, a component of the system in FIG. 1, respectively, according to an embodiment of the present invention;

DETAILED DESCRIPTION OF THE PREFERRED EMBODIMENTS

Figure 1:
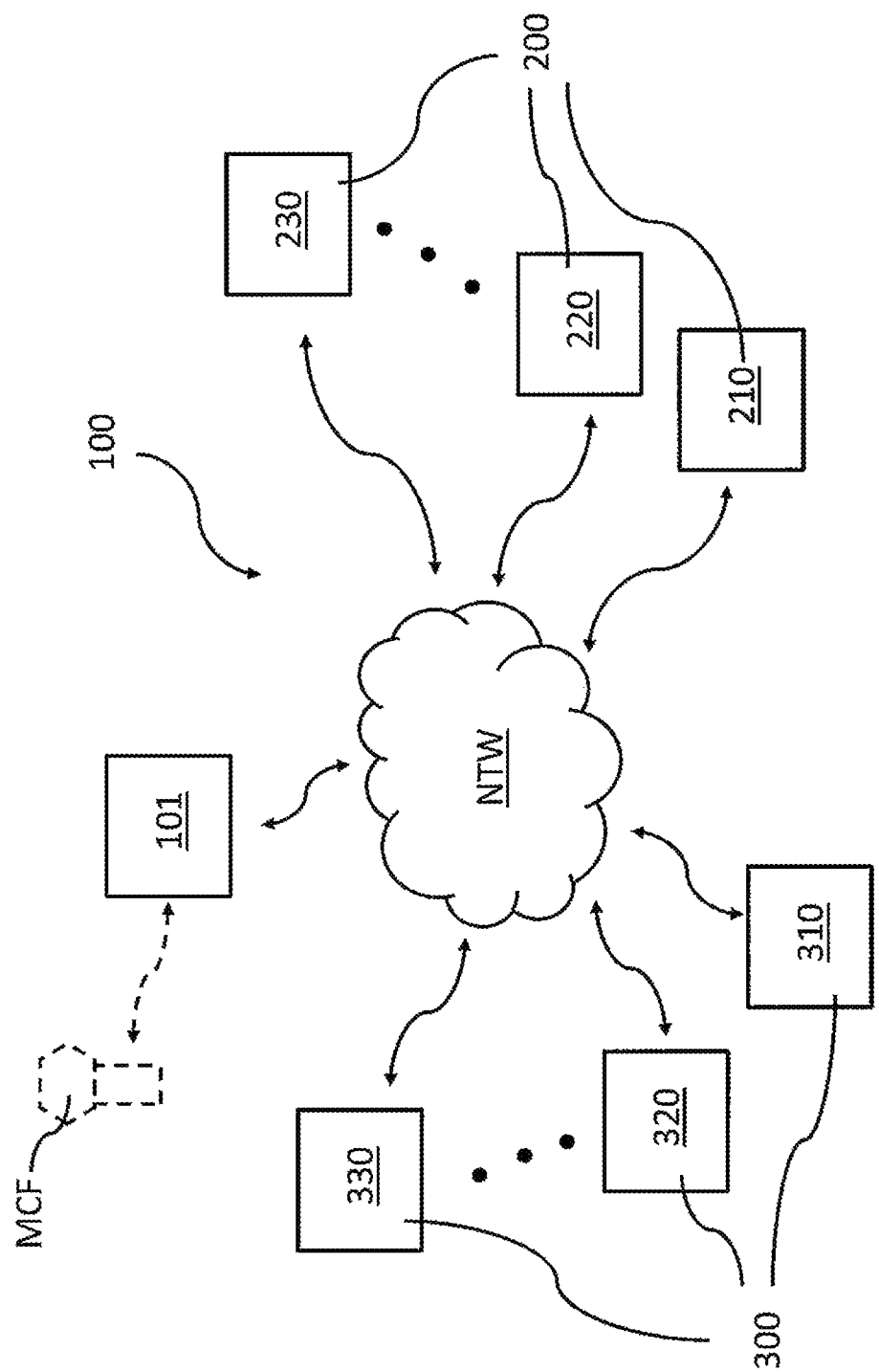
FIG. 1 shows, by means of a block chart, a system for transmitting audio signals to exercise machines of a training class, according to an embodiment of the present invention.

A system 100 for transmitting audio signals to exercise machines of a training class, hereinafter also training system or simply system, according to an embodiment of the present invention, will now be described with reference to FIG. 1.

It is worth noting that equivalent or similar elements are indicated by the same numerical and/or alphanumerical reference in the aforesaid figures. The system 100 comprises a control unit 101 which is accessible to a trainer user, not shown in the figure, in charge of managing a training class.

With reference also to FIG. 2, the control unit 101, in greater detail, comprises a data processing module 102, e.g. a microcontroller or a microprocessor.

The control unit 101 further comprises a memory module 103, operatively connected to the data processing module 102.

The memory module 103 may be either internal or external (as shown in the FIG. 1, for example) to the data processing module 102.

It is worth noting that the memory module 103 is configured to store one or more program codes which can be executed by the data processing module 102 and data generated and processed following the execution of said one or more program codes.

The data processing module 102 is configured to execute a method for transmitting audio signals to exercise machines of a training class, according to the present invention, as will be described below.

In this regard, the control unit 101 also comprises a control interface 104, operatively connected to the data processing module 102, configured to allow a trainer user to interact with the control unit 101.

In an embodiment, the control interface 104 may be of the touchscreen type.

In an embodiment alternative to the previous one, the control interface 104 may be a mechanical keyboard.

The control unit 101 further comprises a display module 105, operatively connected to the data processing module 102.

The display module 105 can be used by the trainer user during the interaction with the control unit 101.

In an embodiment, the display module 105 is separate from the control interface 104.

In an embodiment, in which the control interface 104 is of the touchscreen type, the display module 105 coincides with the control interface 104.

Turning back to the embodiment in FIG. 2, the control unit 101 further comprises a first data communication module 106, operatively connected to the data processing module 102, configured to allow the control unit 101 to transmit and receive data.

Furthermore, the control unit 101 comprises a second communication module 107, operatively connected to the data processing module 102, configured to allow the control unit 101 to transmit, by means of a data communication network NTW (described below), an invitation signal SV1 (shown in FIG. 6, described below) to a use of a streaming audio service made available by the control unit 101.

In greater detail, the invitation signal SV1 comprises a first piece of information NM representative of the streaming audio service, e.g. a name, a second piece of information IPU representative of the control unit 101, e.g. an IP address, a third piece of information NPU representative of a number of communication port of the control unit 101 for enjoying the streaming audio service.

According to an embodiment, such invitation signal SV1 is a broadcast type signal representative of the availability a streaming audio service.

Turning back in general to the embodiment in FIGS. 1 and 2, the control unit 101 is configured to receive a first audio signal SA1 (shown in FIG. 6, described below) representative of a voice command imparted by the trainer user.

In an embodiment, in combination with the previous ones, the first audio signal SA1 is received by a microphone MCF, schematically represented by the dashed lines in FIGS. 1 and 2, with which the trainer user is provided, operatively connected in wireless mode (e.g. by means of a dedicated communication channel in Bluetooth technology) to the control unit 101.

In an embodiment, alternative to the previous one, not shown in the figures, the first audio signal SA1 is received by a microphone MCF with which the trainer user is provided operatively connected in a wired manner to the control unit 101.

In a further embodiment, alternative to the previous ones, also not shown in the figures, the first audio signal SA1 is received by a microphone MCF integrated in the control unit 101.

It is worth noting that the further functions of the control unit 101, in particular for implementing the method for transmitting audio signals to exercise machines of a training class, will be described below.

Turning now to FIG. 1, the system 100 comprises a plurality of exercise machines 200, 300 operatively connected to the control unit 101 by means of a data communication network NTW.

As will be repeated below, the data communication network NTW can be a local network of LAN type, implementing wired or wireless technology.

The plurality of exercise machines 200, 300 comprises a first group of exercise machines 200.

As will be repeated below, the first group of exercise machines 200, also indicated individually in FIG. 1 by reference numerals 210, 220, 230, is configured to be used in a training class.

It is worth clarifying that "training class" means the training of multiple users, each of whom using an exercise machine of a plurality of exercise machines, e.g. the first group of exercise machines 200.

As shown in FIG. 1, the plurality of exercise machines 200, 300 further comprises a second group of exercise machines 300.

The second group of exercise machines 300, also indicated individually in FIG. 1 by reference numerals 310, 320, 330, is not configured to be used in a training class.

In other words, the plurality of exercise machines 200, 300 are representative of the entire set of exercise machines of a gym or club, in which the first group of exercise machines 200 represents the exercise machines configured to be used in a training class, while the second group of exercise machines 300 represents all other exercise machines of the gym, not configured to be used in the training class.

For the purposes of the present invention, "exercise machine" means any exercise apparatus which can be used in a training class, such as, for example, a treadmill, a bike, a cyclette, a rower, a spinning machine, a muscle development machine and so on.

In particular, the first group of exercise machines 200, which can be used in the training class, are preferably exercise machines of the same type (e.g. treadmills, bikes, rowing machines and so forth) and are arranged within the same location (gym or club), which may be a closed, limited location or a dedicated open space.

With particular reference now to FIG. 3, one of the exercise machines, indicated by the reference numeral 210, of the first group of exercise machines 200, will be described below.

Such description applies to any of the exercise machines 210, 220, 230 of the aforesaid first group of exercise machines 200 of the plurality of exercise machines 200, 300.

The exercise machine 210 comprises a respective data processing unit 201, e.g. a microprocessor or a microcontroller.

The exercise machine 210 further comprises a respective memory unit 202, operatively connected to the data processing unit 201.

The memory unit 202 can be either internal or external (as shown in the FIG. 1, for example) to the data processing unit 201.

It is worth noting that the memory unit 202 is configured to store one or more program codes which can be executed by the data processing unit 201 and data generated and processed following the execution of one or more program codes.

The data processing unit 201 is configured to control the operation of the exercise machine 210 of said first group of exercise machines 200 during the execution of the method for transmitting audio signals to exercise machines of a training class according to the present invention, as will be described below.

Figure 6:
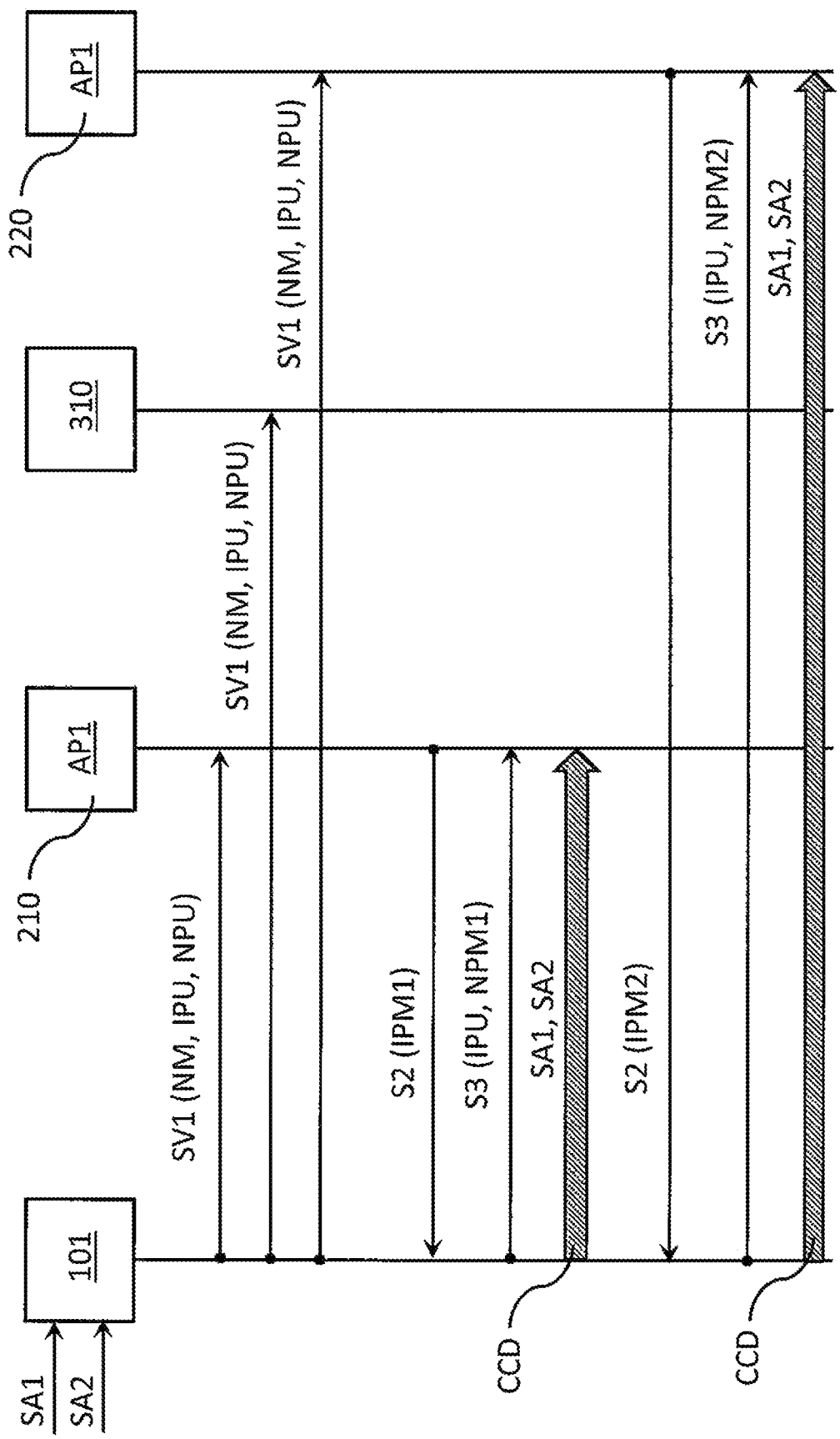
FIG. 6 shows, by means of a flow chart, the steps of the method in FIG. 5, in an embodiment of the present invention.

It is worth noting that in order to be able to use the audio signals transmitted with the method of transmitting audio signals according to the present invention, as will be repeated below, the data processing unit 201 of the exercise machine 210 is configured to load and execute a software application AP1 (the reference of which is shown in FIG. 6, described below), previously stored in the respective memory unit 202.

In an embodiment, the data processing unit 201, by means of the software application AP1, is also configured to execute a training program received from the control unit 101 on the exercise machine 210.

Turning back to FIG. 3, the exercise machine 210 further comprises a respective control interface 203, operatively connected to the data processing unit 201, configured to allow a user to interact with the exercise machine 210.

In an embodiment, the control interface 203 may be of the touchscreen type.

In an embodiment alternative to the previous one, the control interface 203 may be a mechanical keyboard.

The exercise machine 210 further comprises a respective display unit 204 operatively connected to the data processing unit 201.

The display unit 204 can be used by the trainer user during the interaction with the exercise machine 210.

In an embodiment, the display unit 204 is separate from the control interface 203.

In an embodiment, in which the control interface 203 is of the touchscreen type, the display unit 204 coincides with the control interface 203.

The exercise machine 210 of the first group of exercise machines 200 further comprises a respective data communication unit 205, operatively connected to the data processing unit 201.

The data communication unit 205 of the exercise machine 210 is configured to allow the connection to the control unit 101 by means of the communication network data NTW.

In an embodiment, the exercise machine 210 is connected to the control unit 101 by means of the communication network data NTW using a data connection in wireless mode.

In a further embodiment, alternative to the previous one, the exercise machine 210 is connected to the control unit 101 by means of the communication network data NTW using a wired data connection.

According to the connection method (wired or wireless), the data communication module 106 of the control unit 101 and the respective data communication unit 205 of the exercise machines of the first group of exercise machines 200 implement a respective technology suitable for the correct data communication.

In this respect, it is worth noting that appropriate data transmission security protocols are employed in the data communication data, by means of the communication network data NTW, between the control unit 101 and the first group of exercise machines 200.

It is worth noting that the description of the exercise machine 210 could be repeated for any one of the exercise machines 310, 320, 330 of the second group of exercise machines 300, except for the fact that the data processing unit of any exercise machine of the second group of exercise machines 300 is not configured to control the operation of such exercise machine during the execution of the method of transmitting the audio signals to exercise machines of a training class according to the present invention.

This is obviously due to the fact that, as previously mentioned, the second group of exercise machines 300 are exercise machines which are not configured to be used in a training class.

In this respect, it is worth noting that the data processing unit of an exercise machine 310, 320, 330 of the second group of exercise machines 300 is not configured to load and execute the application software AP1 because this application software was not previously stored in the respective memory units.

Turning back in general to the system 100 in FIG. 1, we will now describe further functions of the control unit 101 and some functions of the exercise machine 210, representing any one of the exercise machines of the first group of exercise machines 200.

The control unit 101, and so the respective data processing module 102, is configured to establish a data communication channel CCD (shown in FIG. 6, described below) for transmitting audio signals between the control unit 101 and the first group of exercise machines 200 of the plurality of exercise machines 200, 300.

In greater detail, the control unit 101 is configured via the second communication module 107, to transmit an invitation signal SV1 to use a streaming audio service made available by the control unit 101.

As previously mentioned, the invitation signal SV1 comprises a first piece of information NM representative of the streaming audio service, e.g. a name, a second piece of information IPU representative of the control unit 101, e.g. an IP address, a third piece of information NPU representative of the communication port number of the control unit 101 for enjoying the streaming audio service.

In this regard, each exercise machine 210, 220, 230 of the first group of exercise machines 200, configured to be used in the training class because they are provided with the software application AP1, is configured to recognize the invitation signal SV1 and to send to the control unit 101, in response to the invitation signal S1, a respective acceptance signal S2 (shown in FIG. 6, described below) of the invitation to use a streaming audio service made available by the control unit 101.

Indeed, only the exercise machines 210, 220, 230 of the first group of exercise machines 200, by being equipped with the application software AP1, are aware of the existence of the streaming audio service and, by means of the software application AP1, can recognize the invitation signal S1 and join the streaming audio service by sending the respective acceptance signal S2, by knowing the dedicated communication protocol among other details.

As shown in FIG. 6, the acceptance signal S2 comprises a first piece of information IPM1 (IMP2) indicative of the exercise machine 210 (220), e.g. an IP address, of the first group of exercise machines 200.

The control unit 101 is configured to receive the acceptance signals S2 of the streaming audio service made available by the control unit 101 sent by each exercise machine of the first group of exercise machines 200.

Furthermore, the control unit 101 is configured to store in the respective memory module 103 the list of first pieces of information IPM1 (IPM2) contained in each received acceptance signal S2.

In response to the acceptance signal S2, the control unit 101 is configured to send an establishment signal S3 (shown in FIG. 6) of the data communication channel CCD for transmitting audio signals to each exercise machine of the first group of exercise machines 200.

The establishment signal S3 of the data communication channel CCD for transmitting audio signals comprises a first piece of information IPU indicative of control unit 101, e.g. the IP address, and a second piece of information NPM1 (NPM2) representative of the communication port number of the control unit 101 reserved for an exercise machine 210 (220) of the first group of exercise machines 200 for enjoying the streaming audio service.

On the basis of the received signal S3 and the information contained therein (first piece of information IPU and second piece of information NPM1 (NPM2)), each exercise machine of the first group of exercise machines 200 is configured to access (i.e. to listen to) the data communication channel CCD for transmitting the audio signal.

Indeed, the data communication channel CCD is preferably a one-way type channel (from the control unit 101 to the first group of exercise machines 200).

As mentioned above, the control unit 101 is further configured to receive a first audio signal SA1 (shown in FIG. 6) representative of a voice command imparted by the trainer user.

Furthermore, the control unit 101 is configured to receive a second audio signal SA2 representative of a piece of music chosen by the trainer user.

In an embodiment, the piece of music is chosen from a plurality of pieces of music stored in the memory module 103 of the control unit 101.

According to a further embodiment, the piece of music is chosen from a plurality of pieces of music stored in a further memory unit external to the control unit 101, e.g. a memory unit with communication interface of the USB type, which can be operatively connected to the control unit 101.

Furthermore, according to a further embodiment, the piece of music is chosen by the trainer user on a portable electronic device of the trainer user (e.g., a smartphone) operatively connected with the control unit, e.g. by means of a communication channel data implementing Bluetooth technology.

According to various embodiments, the piece of music may have been previously stored in the memory unit of the portable electronic device, may be accessible in streaming (e.g. via the Internet) by means of the portable electronic device or may be accessible by means of other software applications (e.g. Spotify or others) installed on the portable electronic device.

Turning back in general to the control unit 101, it is configured to send at least one among the first audio signal SA1 and the second audio signal SA2 to each exercise machine of the first group of exercise machines 200 by means of the respective data communication channel CCD for transmitting audio signals.

This type of transmission, directed only to the exercise machines with which the control unit 101 has established the data communication channel CCD for transmitting audio signals, is also known as Multicast mode.

In particular, the control unit 101 is configured to send at least one among said a first audio signal SA1 and a second audio signal SA2 if the first audio signal SA1 is absent (no voice command of the trainer user) or the second audio signal SA2 is absent (volume of the piece of music reset by the trainer user).

In this case, the control unit 101 is configured to encode said at least one among the first audio signal SA1 or the second audio signal SA2.

If the first audio signal SA1 and the second audio signal SA2 are both present, the control unit 101 is configured to send the first audio signal SA1 and the second audio signal SA2 mixed with each other to all exercise machines of the first group of exercise machines 200 by means of the respective data communication channel CCD for transmitting audio signals.

In greater detail, in this case, the control unit 101 is configured to mixes the first audio signal SA1 and the second audio signal SA2.

Furthermore, the control unit 101 is configured to encode the first audio signal SA1 and the second audio signal SA2 mixed with each other.

It is worth noting that, in an embodiment, before transmitting at least one among the encoded first audio signal SA1 and the encoded second audio signal SA2 or the first audio signal SA1 and the second audio signal SA2 mixed with each other and encoded, the control unit 101 is configured to allow the trainer user to adjust the volume of the first audio signal SA1 independently from the volume of the second audio signal SA2.

Figure 4:
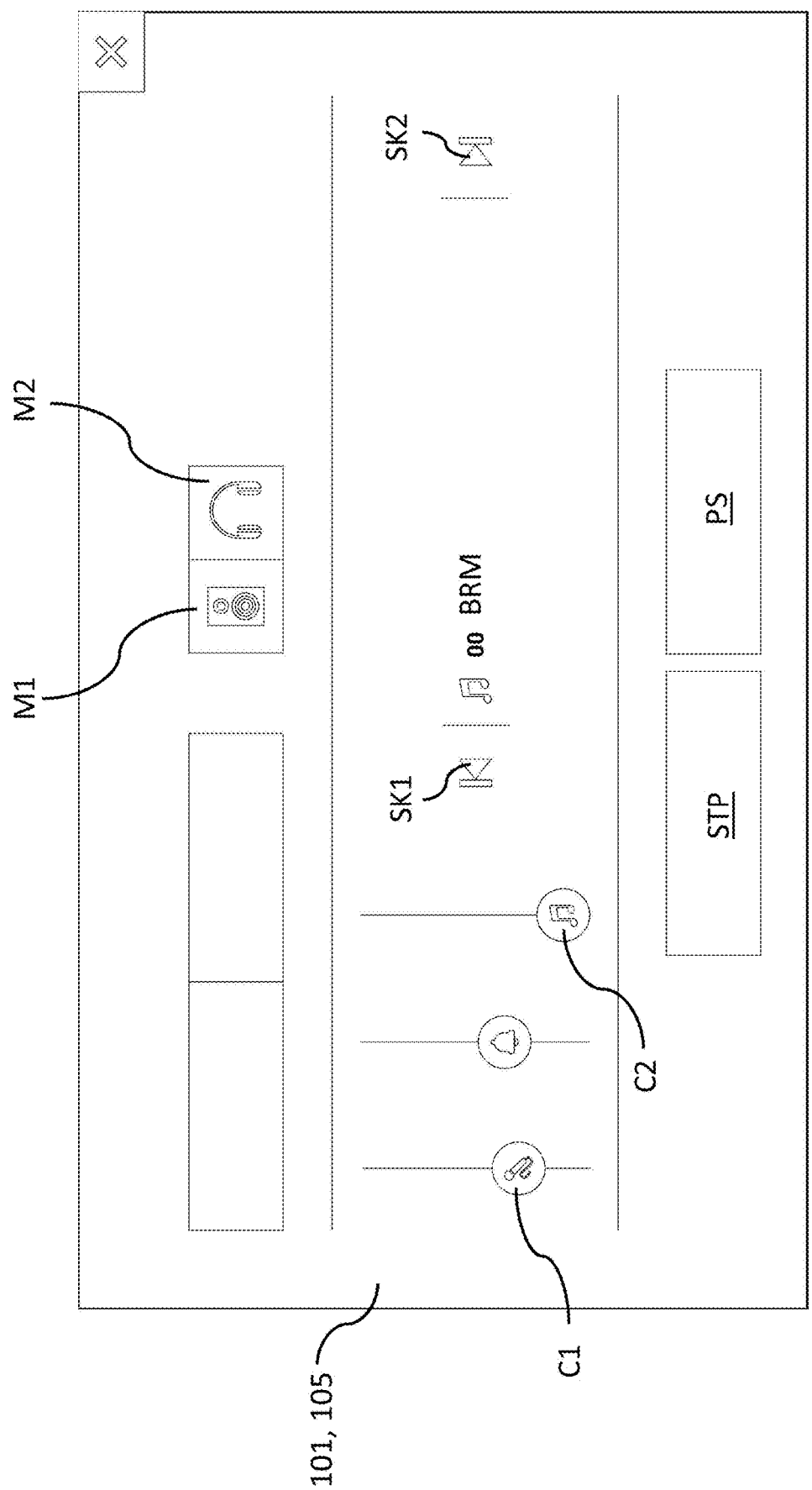
FIG. 4 schematically illustrates respective screens shown by a component of the system in FIG. 1 during its operation.

For example, with reference to FIG. 4, the display module 105 of the control unit 101 can show a screen to the trainer user comprising a plurality of commands of touchscreen type, such as a first command C1 for independently adjusting the first audio signal SA1 and a second command C2 for adjusting the second audio signal SA2.

For example, the trainer user, in an embodiment, by acting on the first command C1 and on the second command C2, can turn up the volume of the first audio signal SA1 (voice command) and turn down the volume of the second audio signal SA2 (piece of music) when the voice command is about to be imparted.

In a further embodiment, the trainer user can turn up the volume of the first audio signal SA1 (voice command) and turn down the volume of the second audio signal SA2 (piece of music) when the voice command is about to be imparted by operating on volume adjusters with which the microphone is equipped.

Turning back to FIG. 4, the plurality of commands of touchscreen type also comprises:

commands to select the distribution mode of the signal between a first mode M1 by means of speaker and a second mode M2 by means of earphones or headphones;

a command SK1 to select a previous piece of music with respect to the piece of music (indicated by reference BRM) being played;

a command SK2 to select a successive piece of music with respect to the piece of music (indicated by reference BRM) being played;

a command STP to stop playing the piece of music BRM;

a command PS to pause the playing of the piece of music;

a command X to close the screen.

Turning back to the first group of exercise machines 200, it is worth noting that each exercise machine of the first group of exercise machines 200 is configured to decode the at least one among the encoded first audio signal SA1 and the encoded second audio signal SA2 received from control unit 101 by means of the data communication channel CCD for transmitting audio signals.

Furthermore, each exercise machine of the first group of exercise machines 200 is configured to provide the at least one among the first decoded audio signal SA1 and the decoded second audio signal SA2 to the respective user.

Furthermore, in an embodiment, if both the first audio signal SA1 and the second audio signal SA2 are present, each exercise machine of the first group of exercise machines 200 is configured to decode the first audio signal SA1 and the second audio signal SA2 mixed with each other and encoded received from control unit 101 by means of the data communication channel CCD for transmitting audio signals.

Furthermore, in this embodiment, each exercise machine of the first group of exercise machines 200 is configured to provide to the respective user simultaneously the first audio signal SA1 (trainer user's voice command) and the second audio signal SA2 (piece of music chosen by the trainer user) mixed with each other and decoded.

It is worth noting that in an embodiment, before transmitting, the control unit 101 is configured to allow the trainer user to adjust the volume of the first audio signal SA1 independently from the volume of the second audio signal SA2.

In an embodiment, said at least one among the first audio signal SA1 and the second audio signal SA2 or the first audio signal SA1 and the second audio signal SA2 mixed with each other may be provided to the user by means of earphones or headphones available to the user, operatively connected to the exercise machine in wireless mode (e.g. using in Bluetooth technology) or wired mode.

In an embodiment alternative to the previous one, said at least one among the first audio signal SA1 and the second audio signal SA2 or the first audio signal SA1 and second audio signal SA2 mixed with each other may be provided to the user by means of a speaker with which the exercise machine is provided.

It is worth noting that this embodiment preferably refers to the case in which the first group of exercise machines 200 is a training class arranged within a closed space inside the gym or club, so that the use of speakers does not cause annoyance or disturbance to other users of the gym or club who are not training in the training class.

According to an embodiment, each exercise machine of the first group of exercise machines 200, is configured to allow the user to control (although not separately) the volume of said at least one among the first audio signal SA1 and the second audio signal SA2 decoded by the respective exercise machine or the first audio signal SA1 and the second audio signal SA2 mixed with each other and decoded by the respective exercise machine.

A method 400 for transmitting audio signals to exercise machines of a training class, hereinafter also training method or simply method, according to an embodiment of the present invention, will now be described with reference also to FIG. 5.

The method 400 comprises a symbolic step of starting ST.

The method 400 comprises a step of providing 401 a control unit 101 which is accessible to a trainer user in charge of managing a training class.

The control unit 101, according to various embodiments, was described above and is not here described for the sake of brevity of description.

The method 400 further comprises a step of providing 402 a plurality of exercise machines 200, 300 operatively connected to the control unit 101 by means of a data communication network NTW.

As mentioned above, the plurality of exercise machines 200, 300 comprises a first group of exercise machines 200.

The first group of exercise machines 200 is configured to be used in the training class.

The plurality of exercise machines 200, 300 further comprises a second group of exercise machines 300.

The second group of exercise machines 300 is not configured to be used in the training class.

The plurality of exercise machines 200, 300, the first group of exercise machines 200 and the second group of exercise machines 300, were described above according to various embodiments.

The method 400 further comprises a step of establishing 403, by the control unit 101 and each exercise machine of the first group of exercise machines 200, a data communication channel CCD for transmitting audio signals between the control unit 101 and the first group of exercise machines 200 of the plurality of exercise machines 200, 300.

Figure 5:
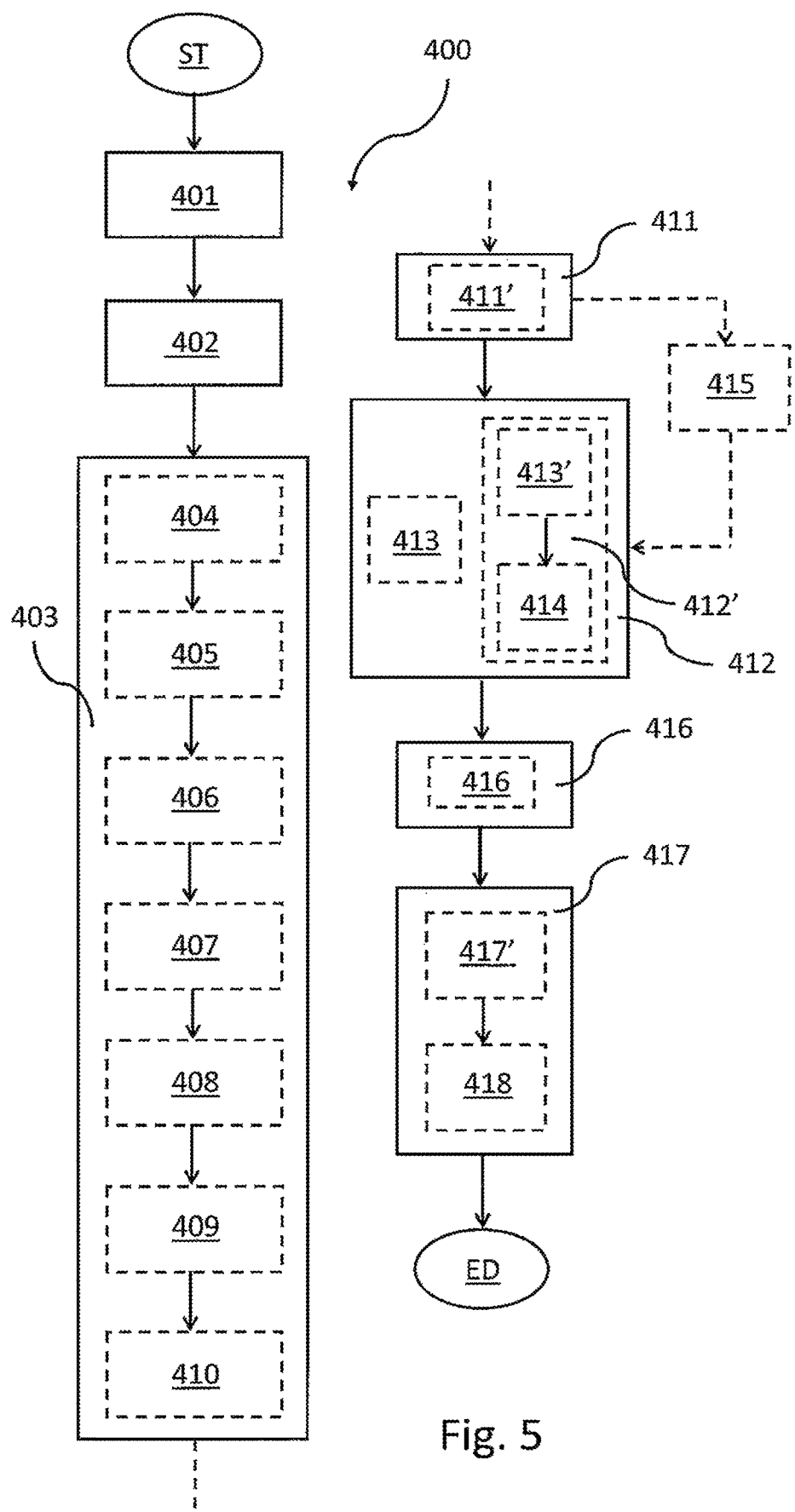
FIG. 5 shows, by means of a block chart, a method for transmitting audio signals to exercise machines of a training class according to an embodiment of the present invention.

In an embodiment, shown by dashed lines in FIG. 5, the step of establishing 403 comprises a step of transmitting 404, by the control unit 101, an invitation signal SV1 to use of a streaming audio service made available by the control unit 101.

Such invitation signal is preferably sent continuously.

As previously mentioned, the invitation signal SV1 comprises a first piece of information NM representative of the streaming audio service, e.g. a name, a second piece of information IPU representative of the control unit 101, e.g. an IP address, a third piece of information NPU representative of the communication port number of the control unit 101 for enjoying the streaming audio service.

In the same embodiment, the step of establishing 403 further comprises a step of recognizing 405, by each exercise machine 210, 220, 230 of the first group of exercise machines 200, the invitation signal SV1.

In the same embodiment, the step of establishing 403 further comprises a step of sending 406 to the control unit 101, by each exercise machine 210, 220, 230 of the first group of exercise machines 200, in response to the invitation signal S1, a respective acceptance signal S2 of the invitation to use a streaming audio service made available by the control unit 101.

As mentioned above, the acceptance signal S2 comprises a first piece of information IPM1 (IMP2) indicative of the exercise machine 210 (220), e.g. an IP address, of the first group of exercise machines 200.

In the same embodiment, the step of establishing 403 further comprises the steps of:

receiving 407, by the control unit 101, the acceptance signals S2 of the streaming audio service made available by the control unit 101 sent by each exercise machine of the first group of exercise machines 200;

storing 408 in the respective memory module 103, by the control unit 101, a list of the first pieces of information IPM1 (IPM2) contained in each acceptance signal S2 received;

sending 409, by the control unit 101, in response to the acceptance signal S2, to each exercise machine of the first group of exercise machines 200, an establishment signal S3 (shown in FIG. 6) of the data communication channel CCD for transmitting audio signals.

As previously mentioned, the establishment signal S3 of the data communication channel CCD for transmitting audio signals comprising a first piece of information IPU indicative of the control unit 101, e.g. the IP address, and a second piece of information NPM1 (NPM2) representative of a communication port number of the control unit 101 reserved for an exercise machine 210 (220) of the first group of exercise machines 200 for enjoying the streaming audio service.

In the same embodiment, also shown by dashed lines in FIG. 5, the step of establishing 403 further comprises a step of accessing 410, by each exercise machine of the first group of exercise machines 200, on the basis of the signal S3 received and of the information therein contained (first piece of information IPU and second piece of information NPM1 (NPM2)), the data communication channel CCD for transmitting audio signals.

Turning back in general to the embodiment in FIG. 5, the method 400 comprises a step of receiving 411, by the control unit 101, at least one among a first audio signal SA1 representative of a voice command imparted by the trainer user and a second audio signal SA2 representative of a piece of music selected by the trainer user.

The modes by means of the first audio signal SA1 and the second audio signal SA2 can be provided to the control unit 101 were described above.

The method 400 further comprises a step of sending 412, by the control unit 101, the at least one among the encoded first audio signal SA1 and the encoded second audio signal SA2 to all exercise machines of the first group of exercise machines 200 by means of the respective data communication channel CCD for transmitting audio signals.

Furthermore, in this embodiment, the step of sending 412 comprises a step of encoding 413, by the control unit 101, the at least one among the first audio signal SA1 and the second audio signal SA2.

According to an embodiment, in combination with the previous one, the step of receiving 411 comprises a step of receiving 411', by the control unit 101, both the first audio signal SA1 representative of a voice command imparted by the trainer user and the second audio signal SA2 representative of a piece of music selected by the trainer user.

In this embodiment, the step of sending 412 comprises a step of sending 412', by the control unit 101, the first audio signal SA1 and the second audio signal SA2 mixed with each other, to all exercise machines of the first group of exercise machines 200 by means of the respective data communication channel CCD for transmitting audio signals.

In greater detail, in this embodiment, the step of sending 412 comprises a step of mixing 413', by the control unit 101, the first audio signal SA1 and the second audio signal SA2 each with other.

Furthermore, in this embodiment, the step of sending 412' comprises a step of encoding 414, by the control unit 101, the first audio signal SA1 and the second audio signal SA2 mixed with each other.

It is worth noting that in an embodiment, shown by dashed lines in FIG. 5, before the step of sending 412, i.e. before sending the at least one among the encoded first audio signal SA1 or the encoded second audio signal SA2 or before sending the first audio signal SA1 and the second audio signal SA2 mixed with each other and then encoded, the method 400 may comprise a step of adjusting 415, by the control unit 101 by means of a command received from the trainer user, the volume of the first audio signal SA1 independently from the volume of the second audio signal SA2.

In a further embodiment, shown in FIG. 5, in combination with the previous ones, the method 400 further comprises a step of decoding 416, by each exercise machine of the first group of exercise machines 200, the at least one among the encoded first audio signal SA1 and the encoded second audio signal SA2 received from the control unit 101 by means of the respective data communication channel CCD for transmitting audio signals.

In an embodiment, if the first audio signal SA1 and the second audio signal SA2 mixed with each other and encoded are both sent, the step of decoding 416 comprises a step of decoding 416' the first audio signal SA1 and the second audio signal SA2, mixed with each other and encoded, received from the control unit 101 by means of the respective data communication channel CCD for transmitting audio signals.

Furthermore, in an embodiment, in combination with the previous ones, the method 400 comprises a step of providing 417 to the respective user, by each exercise machine of the first group of exercise machines 200, the at least one among the decoded first audio signal SA1 (voice command of the trainer user) and the decoded second audio signal SA2 (piece of music chosen by the trainer user).

In an embodiment, in combination with the previous one, if both the first audio signal SA1 and the second audio signal SA2 are decoded, the step of providing 417 comprises a step of simultaneously providing 417' to the respective user, by each exercise machine of the first group of exercise machines 200, the decoded first audio signal SA1 (voice command of the trainer user) and the decoded second audio signal SA2 (piece of music chosen by the trainer user).

According to an embodiment, shown in FIG. 5 by dashed lines, in combination with the previous embodiment, the method 400 further comprises a step of controlling 418 (although not separately), by each exercise machine of the first group of exercise machines 200, on command of the respective user, the volume of the first audio signal SA1 and of the second audio signal SA2 mixed with each other and decoded by the respective exercise machine.

Turning back in general to FIG. 5, the method 400 ends with a symbolic step of ending ED.

An example of operation of the system 100, according to an embodiment thereof, implementing the method 400, according to an embodiment thereof, will now be described with reference to the aforementioned figures.

A trainer user in charge of managing a training class accesses a control unit 101.

The training class provides for the use by multiple users of a first group of exercise machines 200 of a plurality of exercise machines 200, 300 operatively connected to the control unit 101 by means of a data communication network NTW.

The first group of exercise machines 200 is configured to be used in the training class.

The control unit 101 continuously transmits (broadcasts) an invitation signal SV1 for enjoying a streaming audio service made available by the control unit 101. The invitation signal SV1 comprises a first piece of information NM representative of the streaming audio service, e.g. a name, a second piece of information IPU representative of the control unit 101, e.g. an IP address, a third piece of information NPU representative of the communication port number of the control unit 101 for enjoying the streaming audio service.

Each exercise machine 210, 220, 230 of the first group of exercise machines 200 recognizes the invitation signal SV1 and sends to the control unit 101, in response to the invitation signal S1, a respective acceptance signal S2 of the invitation to enjoy a streaming audio service made available by the control unit 101. The acceptance signal S2 comprises a first piece of information IPM1 (IMP2) indicative of the exercise machine 210 (220), e.g. an IP address, of the first group of exercise machines 200.

The control unit 101 receives the acceptance signals S2 of the streaming audio service made available by the control unit 101 sent by each exercise machine of the first group of exercise machines 200 and stores a list of first pieces of information IPM1 (IPM2) contained in each received acceptance signal S2 in the respective memory module 103.

In response to the acceptance signal S2, the control unit 101 sends to each exercise machine of the first group of exercise machines 200 an establishment signal S3 of the data communication channel CCD for transmitting audio signals. The establishment signal S3 of the data communication channel CCD for transmitting audio signals comprises a first piece of information IPU indicative of control unit 101, e.g. the IP address, and a second piece of information NPM1 (NPM2) representative of the communication port number of the control unit 101 reserved for an exercise machine 210

(220) of the first group of exercise machines 200 for enjoying the streaming audio service.

Each exercise machine of the first group of exercise machines 200, on the basis of the received signal S3 and the information contained therein (first piece of information IPU and second piece of information NPM1 (NPM2)), accesses (listens to) the data communication channel CCD for transmitting the audio signal.

At this point, the control unit 101 receives both a first audio signal SA1 representative of a voice command imparted by the trainer user, e.g. by means of a microphone with which the trainer user is provided and connected to the control unit 101, and a second audio signal SA2 representative of a piece of music chosen by the trainer user, e.g. accessible in streaming from a portable electronic device of the trainer user operatively connected to the control unit 101.

The control unit 101 mixes with each other and encodes the first audio signal SA1 and the second audio signal SA2.

The control unit 101 sends the first audio signal SA1 and the second audio signal SA2 mixed with each other and encoded.

Each exercise machine of the first group of exercise machines 200 provides to the respective user the first audio signal SA1 (trainer user's voice command) and the second audio signal SA2 (piece of music chosen by the trainer user) mixed with each other and decoded.

Each of such exercise machines provides to the respective user simultaneously the first audio signal (trainer user's voice command) and the second audio signal (piece of music chosen by the trainer user) mixed with each other and decoded.

It is apparent that the object of the invention is fully achieved because the method and system according to the present invention allow to transmit a first audio signal representative of a voice command imparted by the user personal trainer and a second audio signal representative of a piece of music selected by the personal trainer user simultaneously (as mixed with each other) to the exercise machines of a plurality of exercise machines whose users have chosen to access the streaming audio service made available by the control unit of the training class.

Indeed, the audio signals, arriving directly to each user on the respective exercise machine, allow the users to clearly distinguish the voice commands imparts by the user personal trainer.

Furthermore, the fact that these audio signals are intended only for the exercise machines whose users have asked to use of the streaming audio service reduces the amount of noise inside the training class.

Furthermore, the possibility for the personal trainer user to vary the volume of the first audio signal with respect to the volume of the second audio signal before transmission allows the users to receive a first audio signal (voice command of the personal trainer user) clearly distinguishable from the second audio signal (piece of music chosen by the personal trainer user).

The user can still control the volume of the first audio signal and the second audio signal mixed with each other and decoded by the respective exercise machine.

Those skilled in art may make changes and adaptations to the method and respective system described above or can replace elements with others which are functionally equivalent to satisfy contingent needs without departing from the scope of protection of the appended claims. All the features described above as belonging to one possible embodiment may be implemented irrespective of the other embodiments described.

The invention claimed is:

1. A method for transmitting audio signals to exercise machines of a training class, comprising steps of:
providing a control unit accessible to a trainer user appointed with managing a training class;
providing a plurality of exercise machines operatively connected to the control unit by a data communication network, the plurality of exercise machines comprising a first group of exercise machines, the first group of exercise machines being configured to be used in the training class;
establishing, by the control unit and each exercise machine of the first group of exercise machines, a data communication channel for transmitting audio signals between the control unit and the first group of exercise machines of the plurality of exercise machines;
receiving, by the control unit, at least one among a first audio signal representative of a voice control imparted by the trainer user and a second audio signal representative of a piece of music selected by the trainer user;
adjusting, by the control unit by a control received from the trainer user, volume of the first audio signal independently of volume of the second audio signal;
sending, by the control unit, the at least one among the first audio signal and the second audio signal to all exercise machines of the first group of exercise machines by the respective data communication channel for transmitting audio signals.

2. A method according to claim 1, wherein the step of sending comprises a step of encoding, by the control unit, the at least one among the first audio signal and the second audio signal.

3. A method according to claim 1, wherein the step of receiving comprises a step of receiving, by the control unit, both the first audio signal representative of a voice control imparted by the trainer user and the second audio signal representative of a piece of music selected by the trainer user.

4. A method according to claim 3, wherein the step of sending comprises a step of sending, by the control unit, the first audio signal and the second audio signal mixed with each other, to all exercise machines of the first group of exercise machines by the respective data communication channel for transmitting audio signals.

5. A method according to claim 4, wherein the step of sending comprises steps of:
mixing, by the control unit, the first audio signal and the second audio signal with each other;
coding, by the control unit, the first audio signal and the second audio signal mixed with each other.

6. A method according to claim 1, wherein the step of adjusting comprises adjusting the volume before the step of sending.

7. A method according to claim 1, further comprising a step of decoding, by each exercise machine of the first group of exercise machines, the at least one among the first audio signal and the second audio signal received from the control unit by the respective data communication channel for transmitting audio signals.

8. A method according to claim 1, further comprising a step of decoding, by each exercise machine of the first group of exercise machines, the at least one among the first audio signal and the second audio signal received from the control unit by the respective data communication channel for transmitting audio signals, the step of decoding comprising a step of decoding the first audio signal and the second audio signal, mixed with each other and encoded, received from the control unit by the respective data communication channel for transmitting audio signals.

9. A method according to claim 7, comprising a step of providing a respective user, by each exercise machine of the first group of exercise machines, with the at least one among the first audio signal and the second audio signal.

10. A method according to claim 9, wherein the step of providing comprises a step of simultaneously providing the respective user, by each exercise machine of the first group of exercise machines, with the first audio signal and the second audio signal.

11. A method according to claim 10, comprising a step of controlling, by each exercise machine of the first group of exercise machines, on command of the respective user, volume of the first audio signal and of the second audio signal mixed with each other and decoded by the respective exercise machine.

12. A method according to claim 1, wherein the step of establishing comprises a step of transmitting, by the control unit, an invitation signal to a streaming audio service made available by the control unit, the invitation signal comprising a first piece of information representative of the streaming audio service, a second piece of information representative of the control unit, a third piece of information representative of a communication port number of the control unit for the streaming audio service.

13. A method according to claim 12, wherein the step of establishing further comprises a step of recognizing, by each exercise machine of the first group of exercise machines, the invitation signal.

14. A method according to claim 13, wherein the step of establishing further comprises a step of sending to the control unit, by each exercise machine of the first group of exercise machines, in response to the invitation signal, a respective acceptance signal of the invitation to a streaming audio service made available by the control unit, the acceptance signal comprising a first piece of information indicative of the exercise machine of the first group of exercise machines.

15. A method according to claim 14, wherein the step of establishing further comprises steps of:
receiving, by the control unit, the acceptance signals of the streaming audio service made available by the control unit sent by each exercise machine of the first group of exercise machines;
storing in a respective memory unit, by the control unit, a list of the first pieces of information contained in each acceptance signal received;
sending, by the control unit, in response to the acceptance signal, to each exercise machine of the first group of exercise machines, an establishment signal of the data communication channel for transmitting audio signals, the establishment signal of the data communication channel for transmitting audio signals comprising a first piece of information indicative of the control unit and a second piece of information representative of a communication port number of the control unit reserved for an exercise machine of the first group of exercise machines for the streaming audio service.

16. A method according to claim 15, wherein the step of establishing further comprises a step of accessing, by each exercise machine of the first group of exercise machines, on the basis of the acceptance signal received and of information contained in the acceptance signal received, the data communication channel for transmitting audio signals.

17. A system for transmitting audio signals to exercise machines of a training class, comprising:
a control unit of a training class, the control unit being accessible to a trainer user appointed with managing the training class;
a plurality of exercise machines operatively connected to the control unit by a data communication network, the plurality of exercise machines comprising a first group of exercise machines, the first group of exercise machines being configured to be used in the training class;
the control unit being configured to:
establish with each exercise machine of the first group of exercise machines a data communication channel for transmitting audio signals between the control unit and the first group of exercise machines of the plurality of exercise machines;
receive at least one among a first audio signal representative of a voice control imparted by the trainer user and a second audio signal representative of a piece of music selected by the trainer user;
adjust, by a control received from the trainer user, volume of the first audio signal independently of volume of the second audio signal;
send the at least one among the first audio signal and the second audio signal to all exercise machines of the first group of exercise machines by the respective data communication channel for transmitting audio signals.

18. The system according to claim 17, wherein control unit is configured to adjust the volume of the first audio signal and then send the at least one among the first audio signal and the second audio signal.

* * * * *